US007940299B2

United States Patent
Geng (10) Patent No.: US 7,940,299 B2
(45) Date of Patent: May 10, 2011

(54) METHOD AND APPARATUS FOR AN OMNI-DIRECTIONAL VIDEO SURVEILLANCE SYSTEM

(75) Inventor: Z. Jason Geng, Rockville, MD (US)

(73) Assignee: Technest Holdings, Inc., Boston, MA (US)

(*) Notice: Subject to any disclaimer, the term of this patent is extended or adjusted under 35 U.S.C. 154(b) by 1567 days.

(21) Appl. No.: 10/215,688

(22) Filed: Aug. 9, 2002

(65) Prior Publication Data

US 2003/0071891 A1    Apr. 17, 2003

Related U.S. Application Data

(60) Provisional application No. 60/311,263, filed on Aug. 9, 2001.

(51) Int. Cl.
*H04N 7/18* (2006.01)
(52) U.S. Cl. .................... 348/143; 348/159; 348/36
(58) Field of Classification Search .......... 348/36–39, 348/151–155, 169–172, 14.03, 143, 159, 348/207.99; 382/228; *H04N 7/18*
See application file for complete search history.

(56) References Cited

U.S. PATENT DOCUMENTS

| | | | | |
|---|---|---|---|---|
| 5,153,716 A * | 10/1992 | Smith | ............................ | 348/39 |
| 5,235,513 A * | 8/1993 | Velger et al. | ..................... | 701/16 |
| 5,317,394 A * | 5/1994 | Hale et al. | ................. | 348/207.99 |
| 5,721,585 A * | 2/1998 | Keast et al. | ..................... | 348/36 |
| 6,002,430 A * | 12/1999 | McCall et al. | ........... | 348/207.99 |
| 6,034,716 A * | 3/2000 | Whiting et al. | .................. | 348/37 |
| 6,226,035 B1 * | 5/2001 | Korein et al. | ................... | 348/36 |
| 6,404,455 B1 * | 6/2002 | Ito et al. | ........................ | 348/169 |
| 6,720,987 B2 * | 4/2004 | Koyanagi et al. | ............... | 348/36 |
| 6,734,911 B1 * | 5/2004 | Lyons | .......................... | 348/340 |
| 6,738,073 B2 * | 5/2004 | Park et al. | .................... | 345/629 |
| 6,870,563 B1 * | 3/2005 | Kang | ............................ | 348/36 |
| 6,879,338 B1 * | 4/2005 | Hashimoto | ..................... | 348/36 |
| 7,006,950 B1 * | 2/2006 | Greiffenhagen et al. | ..... | 382/228 |
| 2001/0002140 A1 * | 5/2001 | Medan et al. | .................. | 348/38 |
| 2002/0191071 A1 * | 12/2002 | Rui et al. | .................. | 348/14.03 |
| 2004/0233274 A1 * | 11/2004 | Uyttendaele et al. | ........... | 348/36 |

* cited by examiner

*Primary Examiner* — Andy S Rao
(74) *Attorney, Agent, or Firm* — Steven L. Nichols; Van Cott, Bagley, Cornwall & McCarthy P.C.

(57) ABSTRACT

A surveillance system uses an image from an omni-directional camera to identify objects or events of interest on which a higher-resolution camera can be trained.

9 Claims, 11 Drawing Sheets

METHOD AND APPARATUS FOR AN OMNI-DIRECTIONAL VIDEO SURVEILLANCE SYSTEM

RELATED APPLICATIONS

The present application claims priority under 35 U.S.C. §119(e) from U.S. Provisional Patent Application No. 60/311,263, entitled "Method and Apparatus for an Intelligent Omni-directional Video Surveillance System," filed Aug. 9, 2001 and incorporated herein by reference in its entirety. The present application is also related to U.S. Pat. No. 6,304,285, issued to Geng on Oct. 16, 2001 and entitled "Method and apparatus for omni-directional imaging." U.S. Pat. No. 6,304,285 is also incorporated herein by reference in its entirety.

FIELD OF THE INVENTION

The present invention relates to video surveillance systems. More particularly, the present invention relates to the combination of an omni-directional imaging system that directs a video camera.

BACKGROUND OF THE INVENTION

A number of approaches have been proposed in the past for imaging systems to achieve a wide field-of-view (FOV). Most of them, however, are able to generate omni-directional images. By "omni-directional images," we mean images with a field-of-view covering entire hemisphere (180 degrees of solid space angle), simultaneously.

Most existing imaging systems employ electronic sensor chips or still photographic film to record images collected by an optical lens system. The image projection for most camera lenses is modeled as a "pin-hole" with a single center of projection. The light rays that can be collected by a camera lens and received by an imaging device typically form a corn with very small opening angle. Therefore, angular field-of-views for conventional cameras are within a range of 5 to 50 degrees. For example, an 8.5 mm F/1.3 camera lens for a ½" CCD (Charge Coupled Device) chip only has an angular FOV of 41.2 degrees.

Optical engineers have designed several versions of wide-viewing-angle lens systems called the fish-eye lens. The fish-eye lens features a very short focal length which, when used in place of a conventional camera lens, enables the camera to view objects over a much wider angle. In general, the wider FOV, the more complicated design the fish-eye lens has. To obtain a hemispherical FOV, the fish-eye lens must be quite large in dimension, complex in optical design, and hence expensive. Also, it is very difficult to design a fish-eye lens that meets the single viewpoint constraint, i.e., all incoming principal light rays intersect at a single point to form a fixed viewpoint.

Fish-eye lenses also introduce distortion into the images generated. Although the images acquired by fish-eye lenses may prove to be good enough for some visualization applications, the distortion compensation issue has not been resolved.

A large field of view of may also be obtained by using multiple cameras in the same system, each pointing toward a different direction. However, seamless integration of the multiple resulting images is complicated and made further difficult by the fact that the image produced by each camera has a different center of projection. The cost for such a system is usually high. The image processing required for multiple cameras or a rotating camera to obtain precise information on the position and azimuth of an object takes a long time and is not suitable for most real-time applications.

Figure 1:
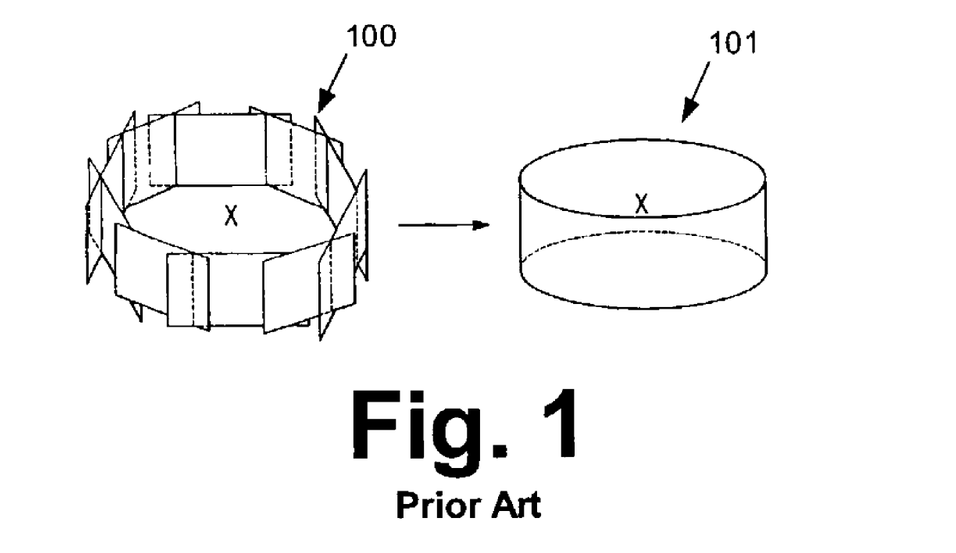
FIG. 1 illustrates the traditional integration of multiple images to generate a panoramic image.

Another straightforward solution to increasing the FOV of an imaging system is to rotate the entire imaging system about its center of projection. This concept is illustrated in FIG. 1. The image sequence (100) acquired by the camera at different positions is then "stitched" together to obtain a panoramic view (101) of the scene. The first disadvantage of any rotating image system is that it requires the use of moving parts, and precision positioning devices. A more serious drawback is that such systems lack the capability of simultaneously acquiring images throughout the wide FOV. Although such system can acquire precise azimuth information in omni-directional view, the imaging process is time-consuming and the method is not applicable to real-time problems such as avoiding collision against moving obstacles or monitoring scenes with mobile objects. This restricts the use of rotating systems to static and non-real-time applications.

Figure 2:
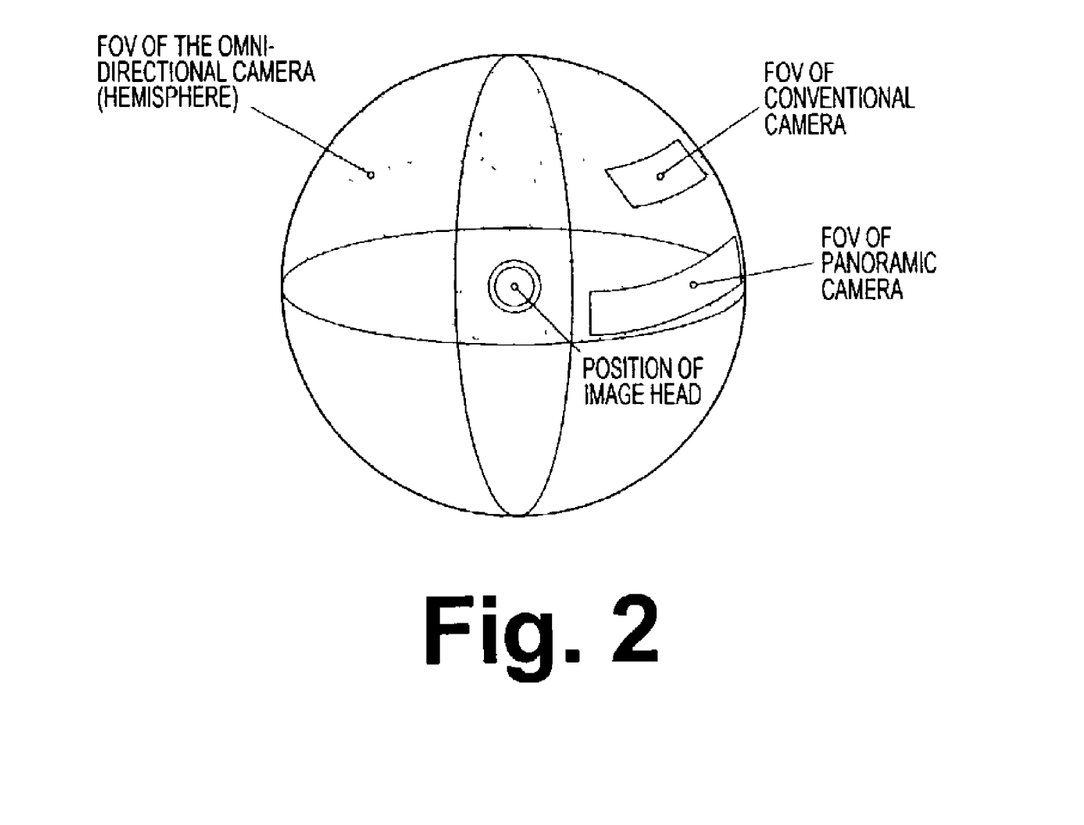
FIG. 2 compares the field of view of various imaging systems discussed.

U.S. Pat. No. 6,304,285 discloses and claims an omni-directional imaging system that overcomes these limitations on prior systems. The omni-directional camera of U.S. Pat. No. 6,304,285 is capable of capturing real-time omni-directional images without using any moving parts. FIG. 2 provides a comparison between the FOV of the omni-directional camera of U.S. Pat. No. 6,304,285, a panoramic camera and a conventional camera.

While the omni-directional camera of U.S. Pat. No. 6,304,285 provides a simultaneous FOV over 180 degrees of solid space with no moving parts, the resolution at any particular point in the resulting image may not be sufficient for all applications, including surveillance systems.

SUMMARY OF THE INVENTION

In one of many possible embodiments, the present invention provides a surveillance system in which an image from an omni-directional camera is used to identify objects or events of interest on which a higher-resolution camera can be trained.

BRIEF DESCRIPTION OF THE DRAWINGS

The accompanying drawings illustrate various embodiments of the present invention and are a part of the specification. Together with the following description, the drawings demonstrate and explain the principles of the present invention. The illustrated embodiments are examples of the present invention and do not limit the scope of the invention.

Throughout the drawings, identical reference numbers designate similar, but not necessarily identical, elements.

DETAILED DESCRIPTION OF THE PREFERRED EMBODIMENTS

The present invention provides, among other things, a set of methods and apparatus for building intelligent omni-directional video surveillance systems. As before, by "omni-directional imaging," we mean an electro-optical device that is able to acquire images with a field-of-view (FOV) substantially covering a hemisphere (180 degrees of solid space angle) or a sphere (360 degrees of solid space) simultaneously.

The field of view of a conventional photographical and/or video camera can be dramatically increased by employing a reflective mirror properly placed in front of the camera. The ultra-wide viewing angle offers significant advantages in video surveillance applications by allowing a global monitoring of surrounding scene and an enhanced situation awareness. Conventional Pan/Tilt/Zoom (PTZ) cameras offer a means to obtain both high-resolution close-up video images of the subject of interest, provided that correct position control commands are available from either a human operation or an electronic guidance system. The combination of an omni-directional camera with a PTZ camera creates a unique capability for monitoring both the global situation of a scene and special events of interest in high-resolution video.

As described above, ordinary cameras (still or video) all have relatively small viewing angles. To monitor a panoramic surrounding scene, multiple cameras, or a camera with a pan/tilt platform, must be used. These systems are complex, expensive, unreliable, and simultaneous coverage of 360° surrounding scene is difficult. These inherent limitations negatively impact the effectiveness of video cameras in surveillance, intrusion detection, teleconferencing and many other applications.

The unique omni-directional camera of U.S. Pat. No. 6,304,285 captures video images with a 360° (hemispherical) viewing angle without any moving elements, and offers a simple, elegant, and low-cost solution to real-time security and surveillance systems. Any reference herein to an "omni-directional camera" will be understood to refer generally to the camera disclosed in U.S. Pat. No. 6,304,285.

The omni-directional camera comprises a sensor or imaging unit, a frame grabber, and image processing software, preferably with a graphical user interface (GUI). The omni-directional camera system is able to collect and process video surveillance information and transfer the information via LAN, WAN, Intranet or Internet for both local and remote security monitoring operations. It can be used for sensitive facilities, educational institutions, government, corporate, financial, retail, airport, transportation, gaming, sporting events, teleconferencing and a myriad of other applications.

The omni-directional camera will now be explained. To dramatically increase the field of view of an imaging system, we use a reflective surface (i.e., a convex mirror). The field of view of a video camera can be greatly increased by using a reflective surface with a properly designed surface shape.

Figure 3:
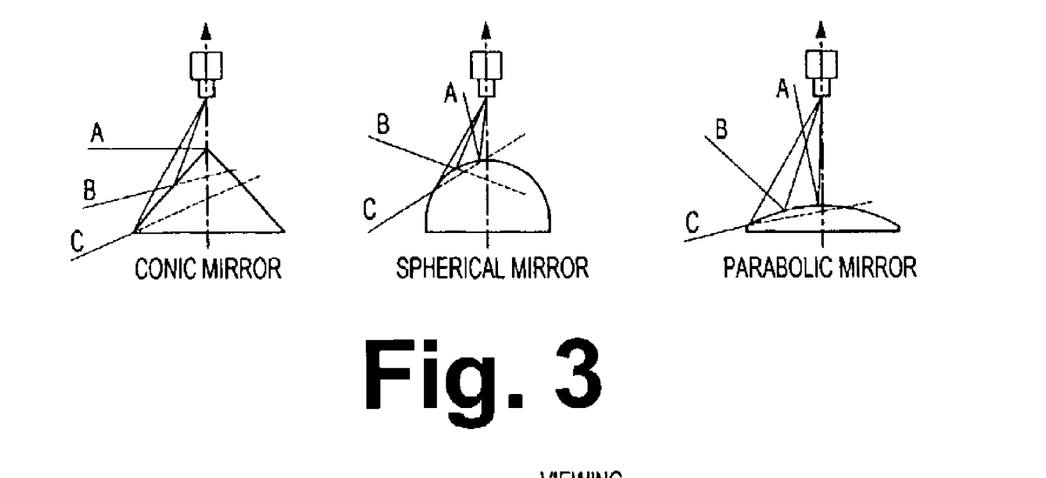
FIG. 3 illustrates a number of possible imaging systems

There are a number of surface profiles that can be used to produce omni-directional FOV. FIG. 3 illustrates three examples: conic mirror, spherical mirror, and parabolic mirror. The optical geometry of these convex mirrors provides a simple and effective means to convert video camera's planar view into an omni-directional view around the vertical axis of these mirrors, without using any moving parts. At the first glance, it appears that the omni-directional imaging task can be accomplished by using any convex mirror. This is not the case.

In reviewing some basic of image formation, we know that an image is a two dimensional pattern of brightness (or colors). A satisfactory imaging system must preserve two essential characteristics: (1) Geometric correspondence: There must be a one-to-one correspondence between pixels in an image and point in the scene. (2) Single Viewpoint Constraint: Each pixel in the image corresponds to a particular viewing direction defined by a ray from that pixel on image plane through a "pinhole" (single viewing point).

Notice that, although the convex mirrors shown in FIG. 3 can greatly increase the FOV, and may prove adequate for certain omni-directional scene monitoring applications, they are not satisfactory imaging devices. These reflecting surfaces do not meet the single viewpoint constraint (SVC). For a high quality omni-directional imaging system, all the light rays coming in the omni imager head should have a single (virtual) viewing point.

We next describe a desirable convex mirror surface profile that satisfies the single viewpoint constraint: all the (extensions of) light rays reflected by the mirror must pass through a single (virtual) viewpoint. We call such a reflective mirror the omni-mirror.

Figure 4:
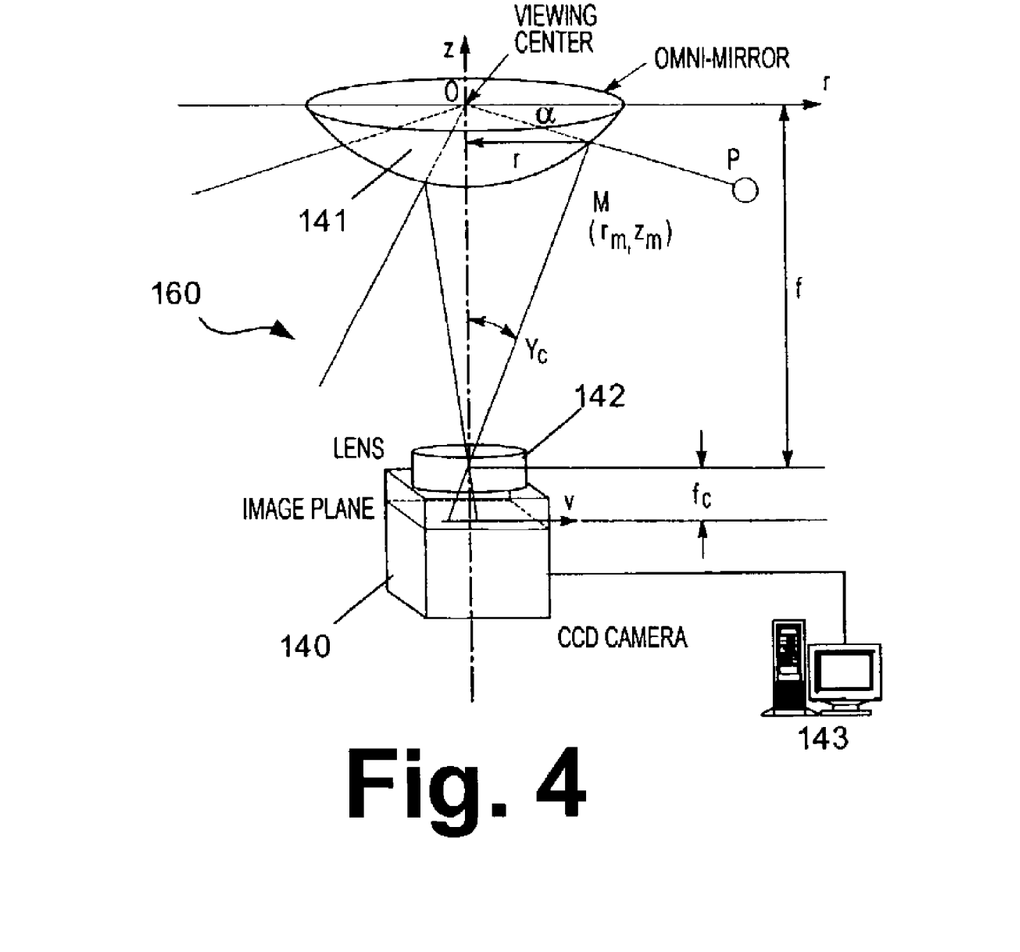
FIG. 4 illustrates an omni-directional imaging system used in embodiments of the present invention.

Let us first define necessary symbols and terminology. As shown in FIG. 4, we use a video camera (140) with a regular lens (142) whose FOV covers entire surface of the OMNI-mirror (141). Since the optical design of camera (140) and lens (142) is rotationally symmetric, all we need to determine is the cross-section function z(r) that defines the mirror surface cross section profile. The mirror (141) is then the solid of revolution obtained by sweeping the cross-section about the optical axis. The function of the omni-mirror (141) is to reflect all viewing rays coming from video camera's viewing center (focal point, labeled as C) to the surface of physical objects in the field-of-view. The key feature of this reflection is that all such reflected rays must have a projection towards a single virtual viewing point at mirror's focal center, labeled as O. In other words, the mirror should effectively steer viewing rays such that the camera equivalently sees the objects in the world from a single viewpoint O.

Consequently, the preferred shape for an omni-mirror (141) is a hyperboloid. A well-know feature of a hyperbolic curve is that: the extension of any ray reflected by the hyperbolic curve originated from one of its focal points passes through its another focal point. If we choose the hyperbolic profile for the omni-mirror, and place a video camera at its focal point C, as shown in FIG. 4, the imaging system will have a single viewpoint at its another focal point O, as if the video camera were placed at the virtual viewing location O.

The mathematical equation that describe the hyperbolic Omni-Mirror surface profile is:

$$\frac{(z+c)^2}{b^2} - \frac{r^2}{a^2} = 1, \text{ where } c = \sqrt{a^2+b^2} \text{ and } f = 2c.$$

The unique feature of the omni-mirror is that the extension of the incoming light ray sensed by the CCD camera is always passing through a single virtual viewpoint O regardless of the location of the projection point M on the mirror surface.

The omni-directional camera system consists of an imaging unit (140-142) and a host computer (143) equipped with an image acquisition board (i.e., a frame grabber). The imaging unit, pictured in FIG. 4, preferably has a miniature CCD video camera (140) pointing towards the omni-mirror (141). The omni-directional images can be acquired in real-time at a video rate (30 frames per second) into the memory of the host computer.

Images obtained from the video camera (140) looking directly at the omni mirror (141) (that reflects the image of objects around it) are distorted. Converting such images into multiple non-distorted, normal perspective images at any orientation, rotation, and magnification within the field of view can be performed by software running on the host computer (143).

Figure 5:
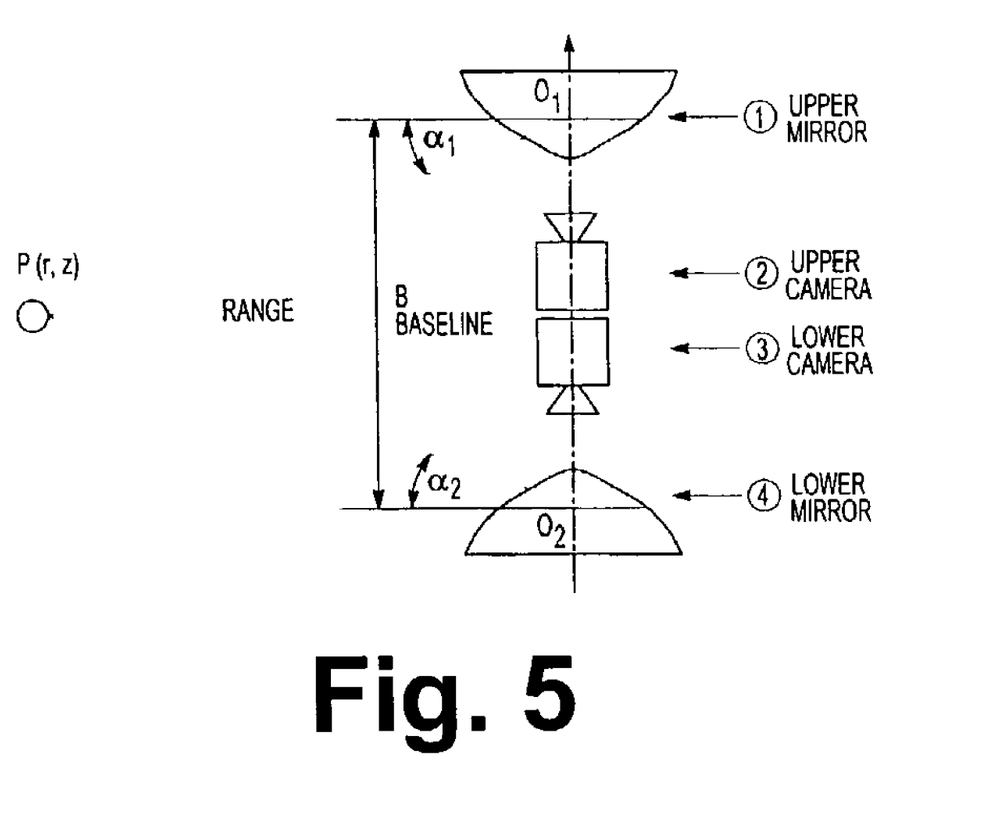
FIG. 5 illustrates an omni-directional imaging system providing a full spherical field of view used in embodiments of the present invention.

As shown in FIG. 5, two omni-cameras can be used in combination to provide a full spherical field of view of an area to be imaged or placed under surveillance. Each of the two cameras provides a hemispheric field of view, which together, covers a spherical field of view. The same host computer can receive and process the images from both omni-directional cameras.

Figure 6:
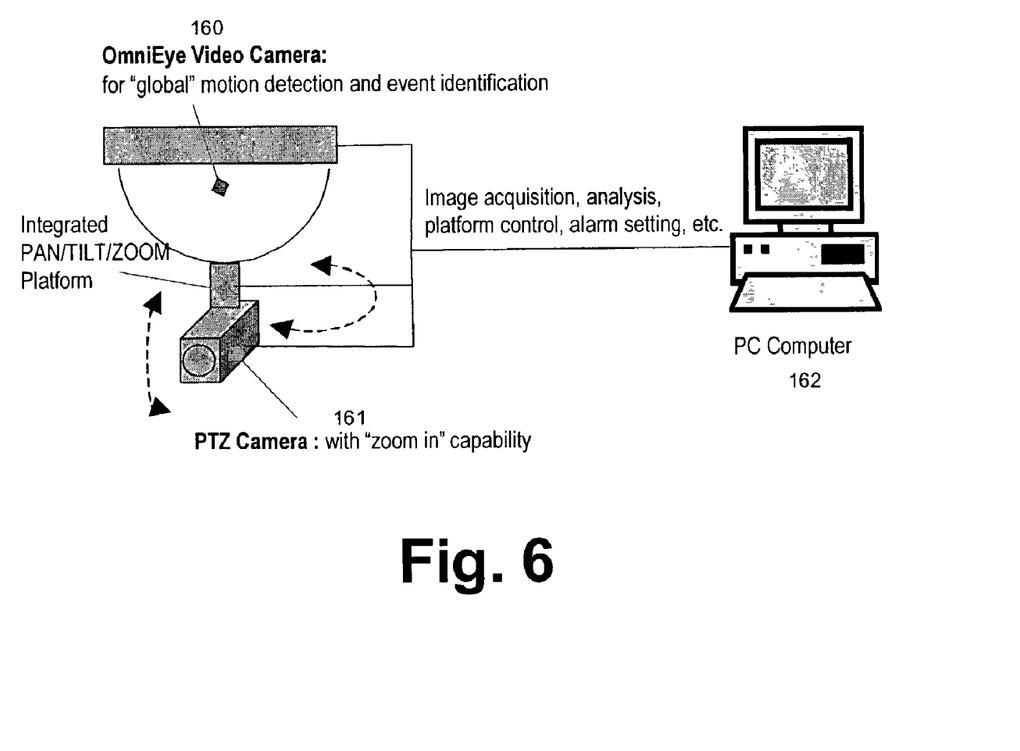
FIG. 6 illustrates a surveillance system according to an embodiment of the present invention.

As shown in FIG. 6, one embodiment of the present invention includes an omni-directional camera (160) used in combination with a PTZ camera (161). Preferably, the two cameras (160, 161) are mounted together at a common location. One way of doing this is illustrated in FIG. 6 with the PTZ camera (161) mounted underneath the omni-directional camera (160). A host computer (162) may receive the output of, and control, both cameras (160, 161).

Combining the ultra-wide viewing angle of the omni-directional camera (160) with the agility and high power optical zooming capability of a pan/tilt/zoom camera (161) provides an entirely new concept for intelligent and automatic PTZ control. Instead of using human operator to watch a site or situation and control the viewing direction of a PTZ camera, the omni-directional camera (160) can be used a global watcher to monitor what is happening in the scene under scrutiny. Intelligent event detection algorithms can be employed to automatically analyze the information collected by the omni-directional camera (160) and decide where to direct the PTZ camera (161) for a more detailed or higher-resolution image.

The omni-directional video camera (160) takes real-time 360-degree video images of the surrounding area. Using, for example, reference image subtraction and other video processing techniques, the host computer (162) will be able to detect interesting events and/or routine operations. Based on the comprehensive image provided by the omni-directional camera (160), the host computer (162) will be able to choose the most important subject and thus determine the viewing direction of the zooming PZT camera (161). Since the PTZ camera (161) and the omni-directional camera (160) are co-axially installed, the location of the subject in the omni-directional camera image can be easily converted into the target position for the PTZ camera (161). An electronic motion control module will be able to point the PTZ camera (161) toward the location of the targeted subject and high-resolution video images are then taken.

Figure 7:
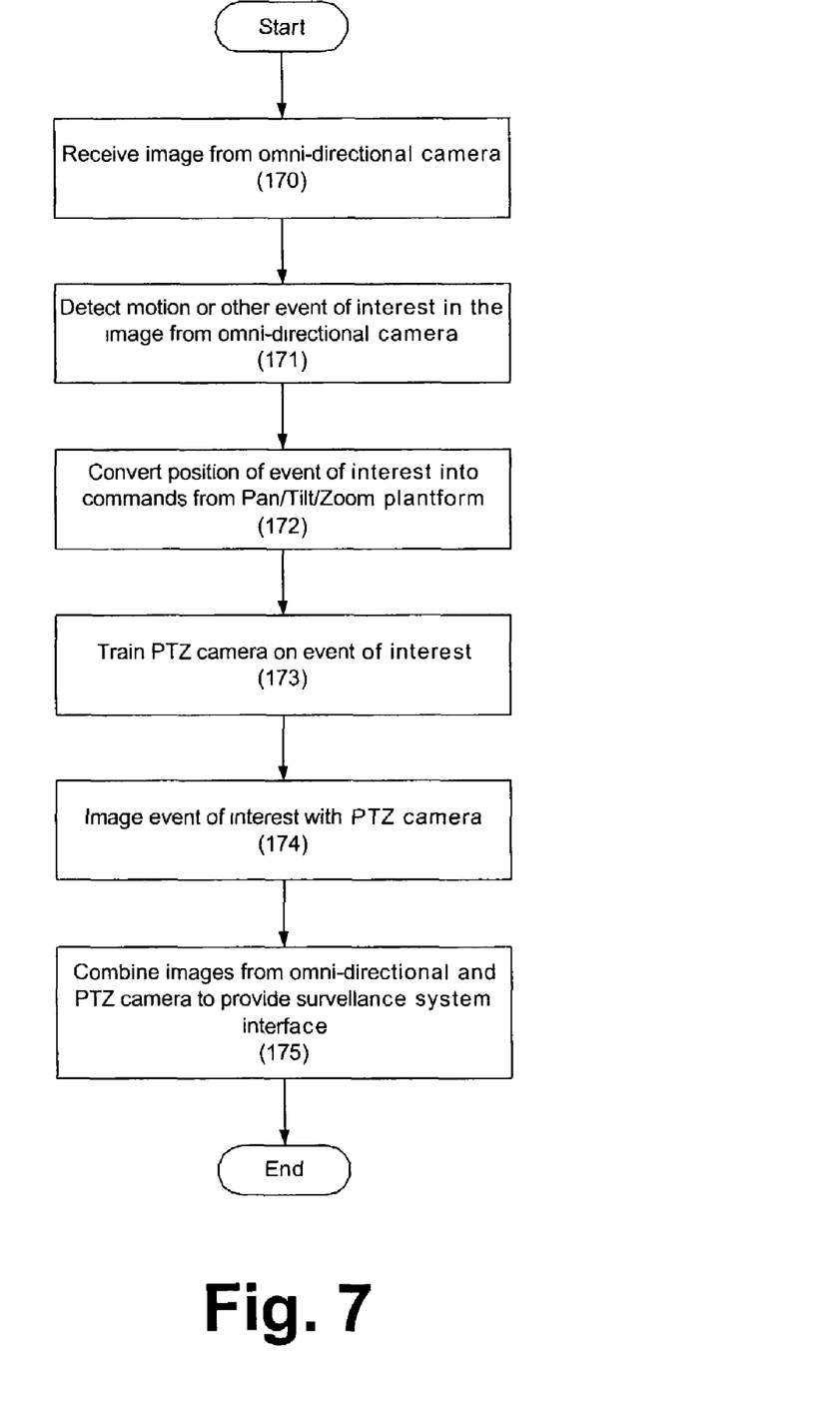
FIG. 7 is a flowchart illustrating a method of operating a surveillance system according to the present invention.

This process is outlined in FIG. 7. As shown in FIG. 7, an omni-directional image is received from the omni-directional camera (170). This image is processed to identify specific objects or events of interest that deserve closer scrutiny. (171). This may be done through motion detection, object recognition or any other algorithm that can identify an object or event that should be more closely scrutinized. Once the object or event is identified, its position within the omni-directional image is converted into commands for the pan/tilt/zoom platform of the PTZ camera (172). The PTZ camera is then trained on the object or event of interest (173). The PTZ camera then provides high-quality imaging of that object or event (174). Notice that the high-resolution images acquired by the PTZ camera can be "fused" (175) into the 360-degree omni-directional image, thus providing the operators with both global view and local event tracking with high resolution and details. This, however, is optional.

Figure 8:
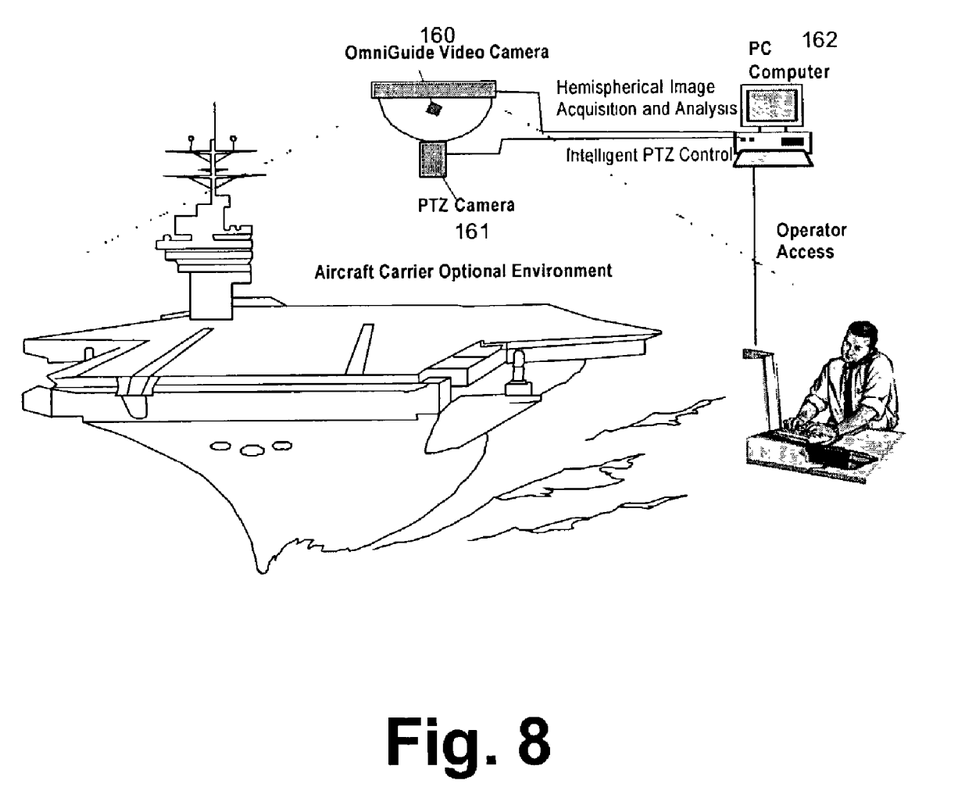
FIG. 8 is an embodiment of a surveillance system according to the present invention applied to monitoring an aircraft carrier flight deck.

One application of the present invention is to monitor the flight deck of an aircraft carrier as shown in FIG. 8. State-of-the-art automatic target recognition (ATR) and tracking technique can be applied to the system to perform video tracking of aircraft in both launch and recovery operations. In terms of tracking aircraft launching out to a half-mile range, a special alarm "zoon" can be set up (via software) on the omni-directional video so that once any object appears in the zoon, the software will perform template matching to judge if the object is an aircraft. If this identification result is positive, the PTZ camera will be controlled to aim toward the aircraft and perform tracking. Meanwhile the omni-directional camera sensor will continue to offer its global view of the scene and monitoring any abnormal in other areas.

The combination of the unique 360-degree (hemispherical) viewing capability from the omni-directional camera with the highly agile PTZ camera(s) that has over 10× zooming power would lead to an intelligent surveillance system that has complementary functionalities suitable for flight deck operation monitoring. Preferably, the PTZ camera will be mounted co-axially with the omni-directional camera and the pan/tilt/zoom motion of the PTZ camera will be controlled automatically by the host computer (162) based on the omni-directional image acquired by the omni-directional camera (160). The omni-directional camera (160) video images provide "global" monitoring capability, while the PTZ camera (161) will be "zoomed-in" on active target to provide detailed coverage of the event. The omni-directional image information offer operators/algorithms a sensor of context that enable them to know just what lies outside the PTZ camera's immediate image.

Figure 9:
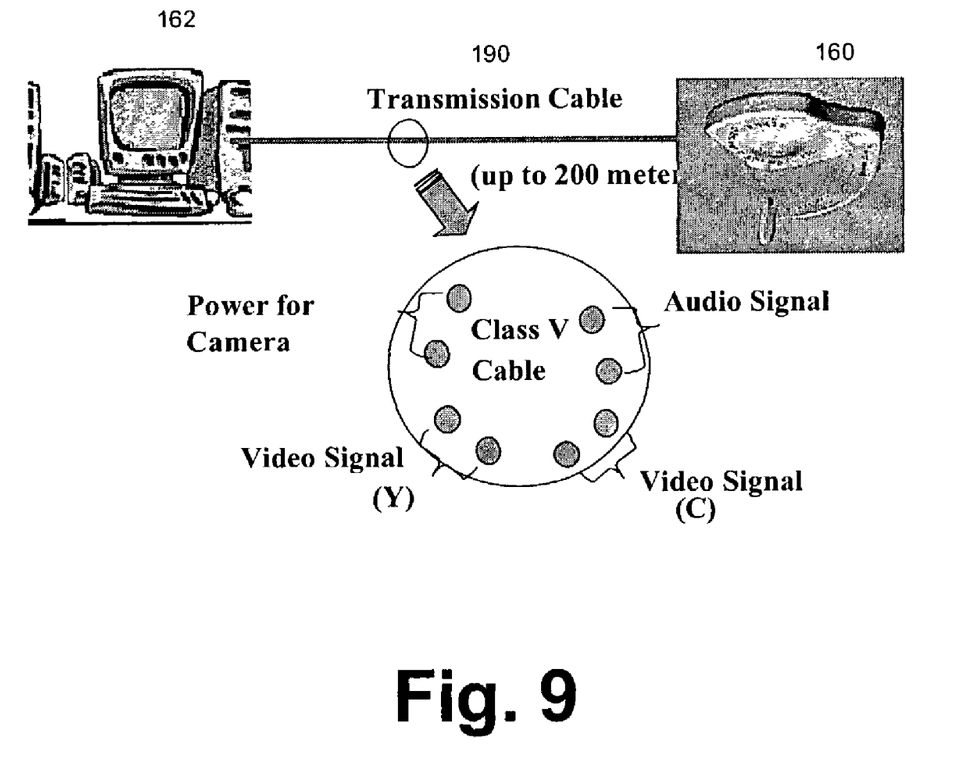
FIG. 9 is an embodiment of the present invention incorporating audio with video transmissions.

FIG. 9 illustrates an embodiment in which the transmission cable (190) between the host (162) and the omni-directional camera (160) can carry audio as well as video communication. Preferably, a two-way audio communication channel can be provided between the host (162) and the omni-directional camera imaging sensor (160).

We have also developed a set of seamless image integration algorithms for piecing multiple images acquired from different sensors into a seamless video mosaic image. The brief outline of these algorithms is described as follows: (1) Perform camera calibration for each of the cameras to extract the geometric parameters of each sensor, including the position, orientation, focal length, lens distortion coefficients, and relative position with each other; (2) Use the camera calibration parameters to rectify the image to correct any geometric distortion; (3) Project all rectified images onto a common world coordinate system; (4) Identify the boundary of each pair of images; (5) Use the "Fuzzy Logic" algorithm to smoothly merge two images at the boundary to ensure there is no obvious discontinuation at the boundary line; (6) Complete the merging process for each pair of images; (7) Global brightness and contrast ratio adjustment.

Notice that our approach of seaming multiple images can be applied to both vertical and horizontal boundaries. In fact, our approach can be applied to almost arbitrarily configured multiple cameras. The power of our approach comes from the fact that we first rectify the images and then project them into a common global coordinate system. The seaming process is done in the global coordinate system. Therefore the algorithm will be the same despite the boundary conditions.

The initial stage of the surveillance problem is the extraction of moving targets from a video stream. There are three conventional approaches to moving target detection: A. Temporal differencing (two-frame or three frame); B. Background subtraction; and C. Optical flow.

Temporal differencing is very adaptive to dynamic environments, but generally does a poor job of extracting all relevant feature pixels. Background subtraction provides the most complete feature data, but is extremely sensitive to dynamic scene changes due to lighting and extraneous events. Optical flow can be used to detect independently moving targets in the presence of camera motion; however, most optical flow computation methods are very complex and are in applicable to real-time algorithms without special hardware.

For embodiments of the present invention, an adaptive background subtraction approach is preferred. This is an attempt to make background subtraction more robust to environmental dynamics. Briefly speaking, for each pixel value in the nth frame, a running average and a form of standard deviation are maintained by temporal filtering. The adaptive filter is implanted This statistical model incorporates noise measurements to determine foreground pixels, rather than a simple threshold, thus enhancing the robustness of the background subtraction algorithm.

Figure 10:
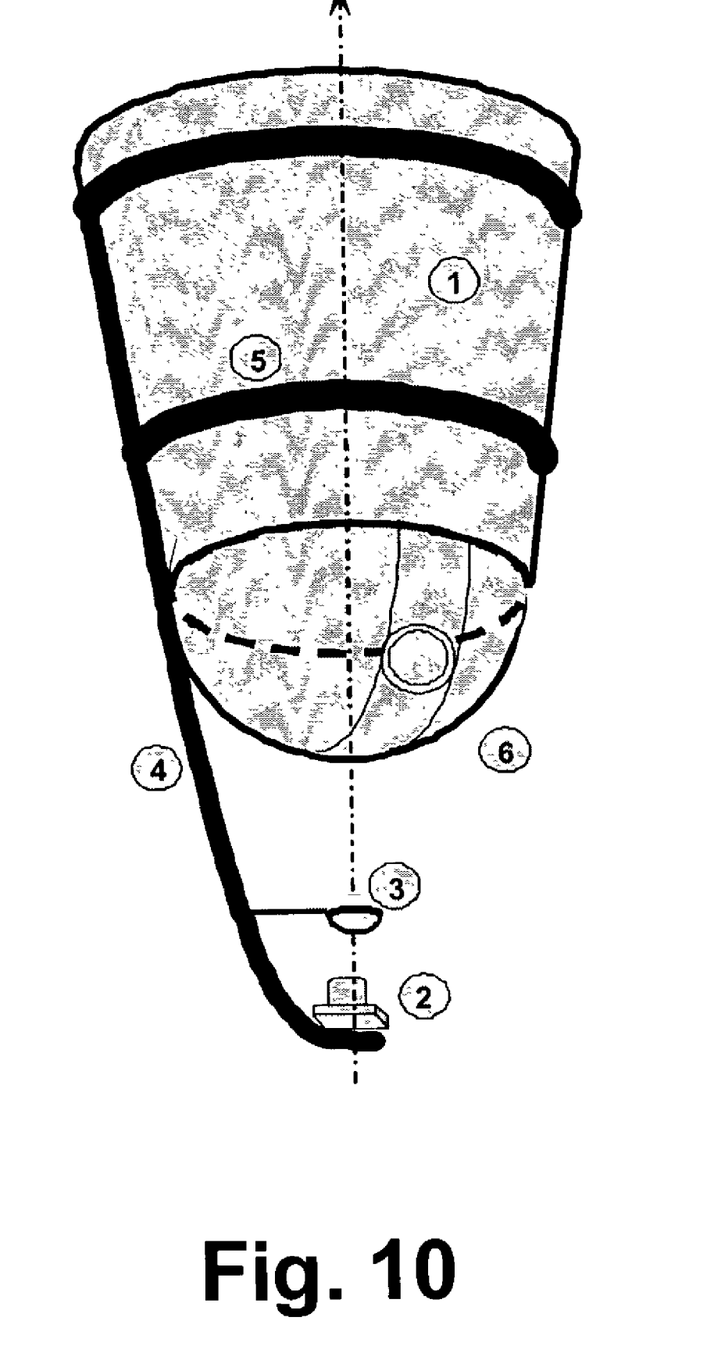
FIG. 10 is another embodiment of a surveillance system according to the present invention.

FIG. 10 illustrates another embodiment of the present invention that arranges the omni-directional camera differently. As shown in FIG. 10, the omni-directional camera (2, 3) is place co-axially below the PTZ camera (6) on a support (4). A housing (1) provides support for the PTZ camera (6) and the support (4), which is anchored (5) to the housing (1). The PTZ camera can be position-controlled based on the control command from the 360-degree image sensor.

Figure 11:
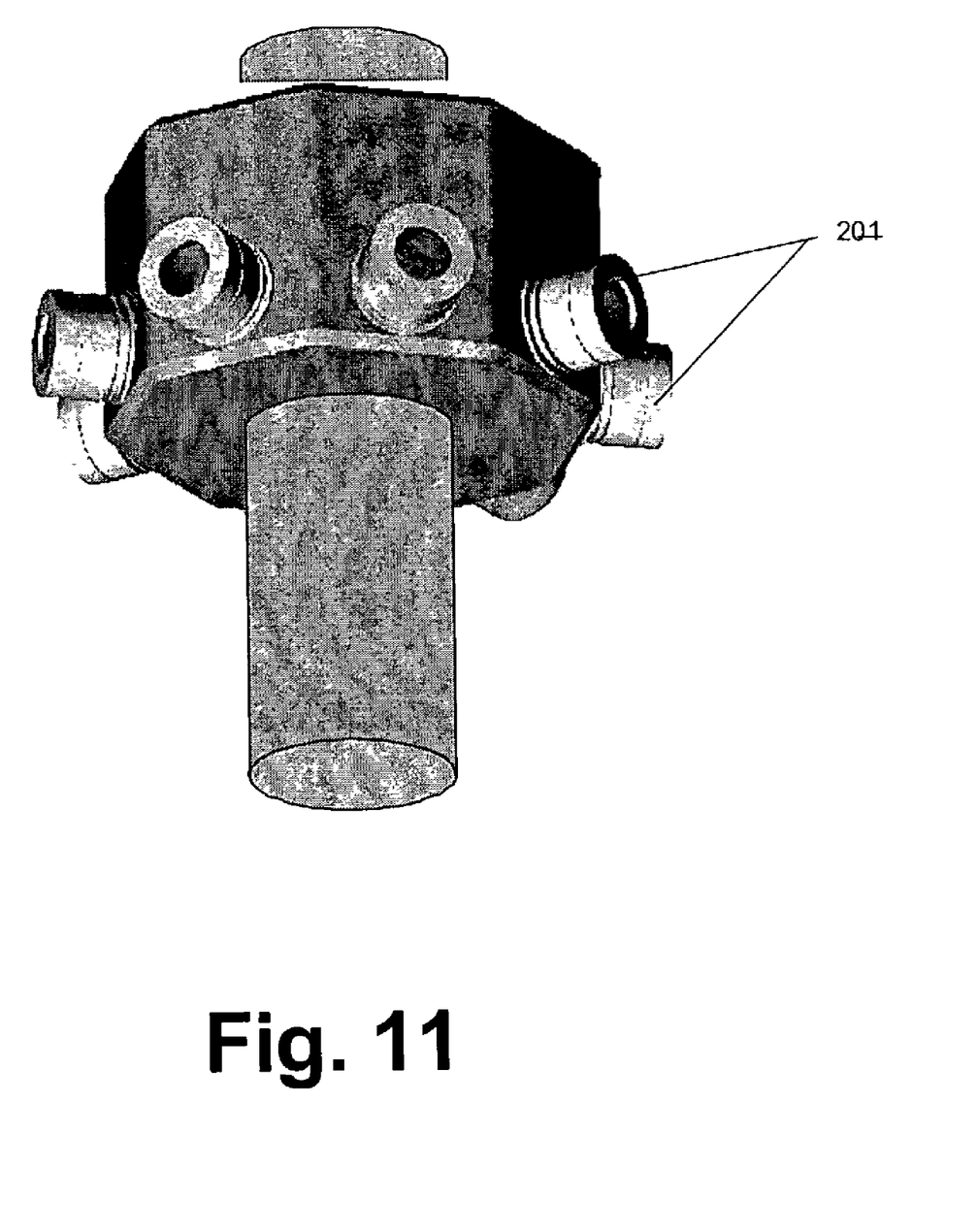
FIG. 11 is another embodiment of a surveillance system according to the present invention.

FIG. 11 illustrates another embodiment of the present invention. For certain applications, high resolution 360-degree video image is desirable. With existing image sensor technology, there is no reasonable chance to meet the image resolution requirement using a single sensor with 360-degree FOV. Not only has the resolving power of the sensor dropped with the increase of FOV, but also nonlinear optical distortion introduced by the nature of omni-directional imaging technology will further deteriorate the pixel resolution in peripheral regions, thus further reduce the resolution of the target at long distance.

To effectively address this critical issue, the present invention may be embodied as shown in FIG. 11. Instead of using single omni-directional sensor (infrared (IR) or visual), we employ eight sensors (201), each with 46 degree FOV, so that the integrated FOV from this ring of eight sensors will be 360 degree.

This configuration provides excellent image resolution, which is critical to surveillance application, both for detection and for recognition. Even with 320×240 IR sensors, this embodiment can achieve 2560×240 image resolution that covers 360-degree surrounding scene. None of existing IR sensor technology is able to achieve such a high resolution.

This configuration also provides more linear distribution of pixel resolution. Unlike the mirror based Omni-directional imaging sensor or fisheye sensor, there is no "wasted resolution" in the central region. All effective resolution of the imaging sensor is fully utilized for target detection and recognition.

This configuration also provides flexible modularized sensor configuration. Considering the variety of application scenarios, such as the "Above Deck", "Below Deck", and Interior surveillance and monitoring for ships, distributed sensors may be more applicable in certain scenarios. The multi-cam configuration offers such flexibility. The multiple sensor can be installed as distributed sensor network. For large size ships, such as carriers, destroyers, and cruisers, multiple sensors on both above deck and below deck are necessary. The development of multi-cam sensor and image integration technology would make it possible for seamlessly integrate information from multiple sensors and provide global situation awareness.

Figure 12:
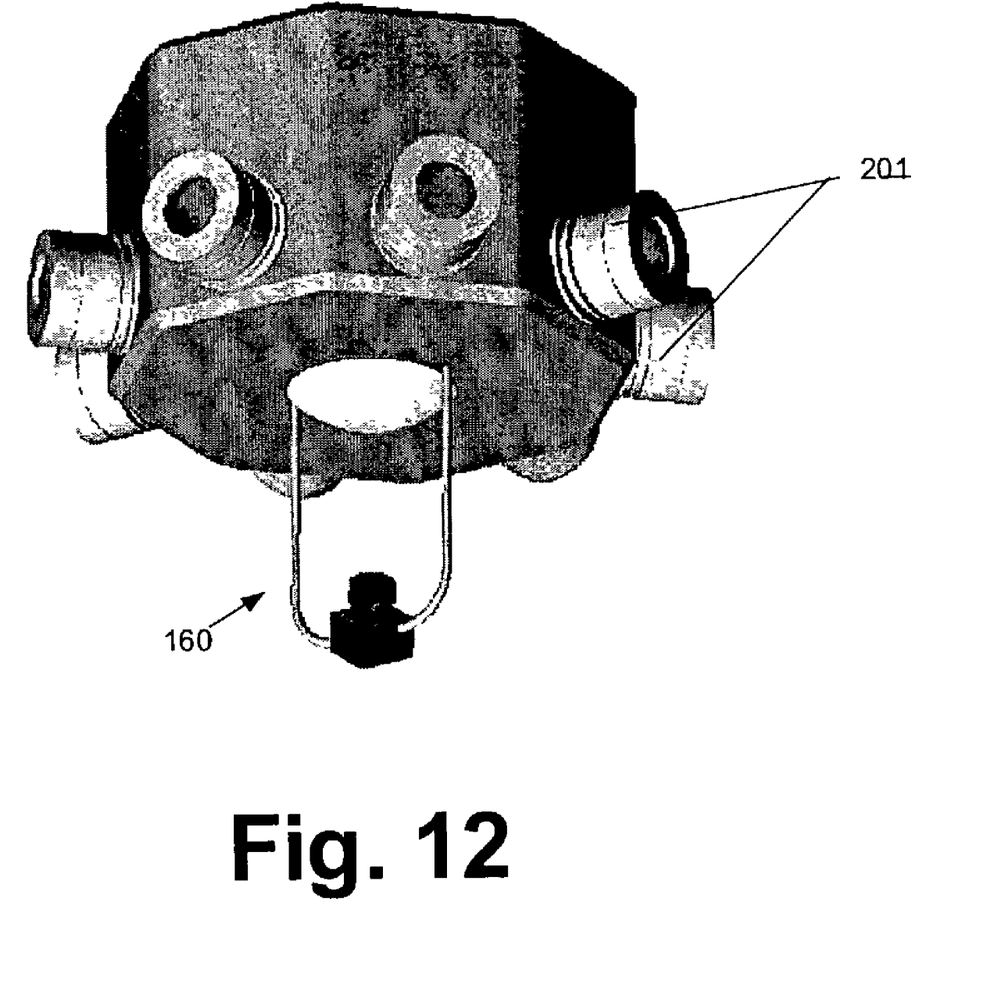
FIG. 12 is another embodiment of a surveillance system according to the present invention.

FIG. 12 illustrates still another embodiment of the present invention. This embodiment combines the multi-cam configuration (201) described above with an omni-directional camera (160). This system integrates our omni-directional camera 360-degree viewing system with a multi-camera matrix feed. The system comes with omni-directional camera, frame grabber board, and customized software that displays up to 16 fixed camera views while the panoramic omni-directional camera is displayed across the bottom of the window. The software perform image unwraps for the omni-directional camera, and motion detection. Once the omni-directional camera detects suspicious object, the SW will automatically display those camera images that cover the suspicious areas. The SW allows multiple viewing windows, provides built-in motion detection, digital zoom. Standard configuration brings in the multi-camera feeds via a multiplexer and runs a connection to a PC for image processing and viewing.

Figure 13:
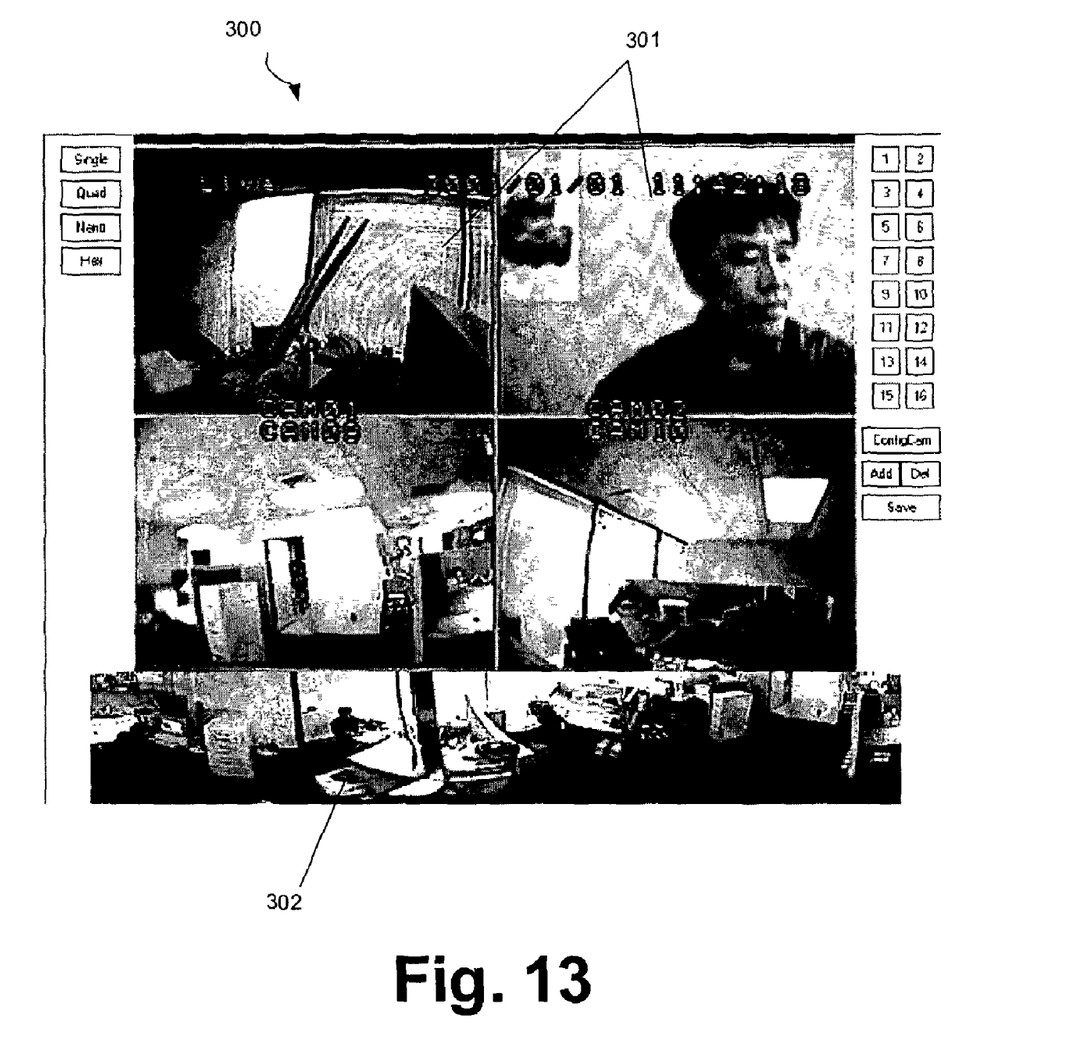
FIG. 13 is an illustration of a preferred user interface for a surveillance system according to the present invention.

FIG. 13 illustrates a preferred user interface (300) for the surveillance system of the present invention. As shown in FIG. 13, images (301) from a number of PTZ cameras can be shown in a matrix. Additionally, a panoramic view (302) of the entire scene provided by the omni-directional camera is added to the interface.

The preceding description has been presented only to illustrate and describe the invention. It is not intended to be exhaustive or to limit the invention to any precise form disclosed. Many modifications and variations are possible in light of the above teaching. For example, all the imaging systems could be infrared to provide an infrared surveillance system.

The preferred embodiment was chosen and described in order to best illustrate the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A surveillance system comprising:
   an omni-directional camera comprising an imaging unit optically coupled to a convex mirror, said omni-directional camera being configured to continuously capture an omni-directional image;
   a higher-resolution camera configured to capture a higher-resolution image of a portion of said omni-directional field of view, wherein said higher-resolution camera is integrated with said omni-directional camera such that said omni-directional camera including said convex mirror and imaging unit extend from and are supported below said higher-resolution camera; and
   a host computer connected to and controlling both said omni-directional camera and said higher-resolution camera;
   wherein said host computer controls said higher-resolution camera based on said omni-directional image from said omni-directional camera.

2. The system of claim 1, wherein said higher-resolution camera has a pan/tilt/zoom platform.

3. The system of claim 2, wherein said host computer drives said pan/tilt/zoom platform.

4. The system of claim 1, wherein said host computer comprises an image processing application that processes said omni-directional image from said omni-directional camera to identify an event or object in said omni-directional image that is of interest according to pre-defined parameters, said host computer then training said higher-resolution camera on said event or object of interest.

5. The system of claim 1, further comprising an audio communications channel between said omni-directional camera and said host computer.

6. The system of claim 1, wherein said omni-directional camera is mounted above said higher-resolution camera.

7. The system of claim 1, further comprising:
   a plurality of higher-resolution cameras each of which is independently controlled and oriented by said host computer; and
   a user interface which simultaneously displays images output from said higher-resolution cameras along with said omni-directional image from said omni-directional camera.

8. The system of claim 1, wherein said omni-directional camera and said higher-resolution camera are mounted co-axially.

9. The system of claim 1, wherein said convex mirror corresponds to a hyperboloid.

* * * * *